US008358434B2

(12) United States Patent
Rautert et al.

(10) Patent No.: US 8,358,434 B2
(45) Date of Patent: Jan. 22, 2013

(54) METHOD AND SYSTEM FOR PRODUCING PRINTING FORMS FOR ANILOX PRINTING PRESSES

(75) Inventors: Jürgen Rautert, Heidelberg (DE); Manfred Jurkewitz, Wiesloch (DE); Günter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1489 days.

(21) Appl. No.: 11/923,801

(22) Filed: Oct. 25, 2007

(65) Prior Publication Data

US 2008/0266586 A1 Oct. 30, 2008

(30) Foreign Application Priority Data

Oct. 26, 2006 (DE) ......................... 10 2006 050 539

(51) Int. Cl.
*G06F 15/00* (2006.01)
*G06K 1/00* (2006.01)
*G06K 15/02* (2006.01)

(52) U.S. Cl. ......... 358/1.2; 358/518; 382/112; 382/167; 101/248; 101/359

(58) Field of Classification Search .................. 345/507, 345/690; 358/1.2, 1.9, 518; 382/162; 101/359
See application file for complete search history.

(56) References Cited

U.S. PATENT DOCUMENTS 3,958,509 A * 5/1976 Murray et al. ................ 101/365
4,468,692 A * 8/1984 Yamada et al. ............... 358/527
4,513,662 A * 4/1985 Schneider ..................... 101/363
4,564,860 A * 1/1986 Ohta ............................. 348/135
4,573,071 A * 2/1986 Sakamoto ...................... 358/527
4,573,190 A * 2/1986 Tsunoda et al. .............. 358/518
4,649,566 A * 3/1987 Tsunoda et al. .............. 101/365
4,763,359 A * 8/1988 Tsunoda et al. .............. 101/365
4,936,211 A * 6/1990 Pensavecchia et al. ....... 101/136
5,235,914 A * 8/1993 Williams et al. .............. 101/467

(Continued)

FOREIGN PATENT DOCUMENTS

DE 4131303 A1 3/1993

(Continued)

OTHER PUBLICATIONS

German Search Report dated Jun. 27, 2007.

(Continued)

*Primary Examiner* — Twyler Haskins
*Assistant Examiner* — Nicholas Pachol
(74) *Attorney, Agent, or Firm* — Laurence A. Greenberg; Werner H. Stemer; Ralph E. Locher

(57) ABSTRACT

A method and a system for producing a printing form for a printing process on a printing press, produces a first printing form based on first image data and prints a printing image on a printing substrate with the printing form. Printing presses without inking zones do not permit regulation of quantitative ink supply with inking zones screws. To permit a printer to manipulate ink density on a printing substrate even after exposure of a first printing plate within a printing press without inking zones, correction values are generated in the vicinity of the printing press in regions on the basis of at least a printing image printed on the printing substrate. The correction values are then used for correcting printing originals on which printing is based and/or screened image data and at least one second printing form is produced on the basis of at least the correction values.

17 Claims, 5 Drawing Sheets

U.S. PATENT DOCUMENTS

| | | | | | |
|---|---|---|---|---|---|
| 5,237,923 | A * | 8/1993 | Williams et al. | .............. | 101/467 |
| 5,255,085 | A * | 10/1993 | Spence | ......................... | 358/527 |
| 5,293,539 | A * | 3/1994 | Spence | ......................... | 358/527 |
| 5,367,673 | A * | 11/1994 | Goldsmith et al. | ........... | 382/167 |
| 5,662,044 | A | 9/1997 | Löffler et al. | | |
| 5,734,741 | A * | 3/1998 | Kurata et al. | ................. | 382/112 |
| 5,969,798 | A * | 10/1999 | Nakagawa et al. | ............. | 355/52 |
| 6,164,757 | A * | 12/2000 | Wen et al. | ....................... | 347/43 |
| 6,441,914 | B1 * | 8/2002 | Barak et al. | .................. | 358/1.14 |
| 6,459,425 | B1 * | 10/2002 | Holub et al. | .................. | 345/207 |
| 6,580,524 | B1 | 6/2003 | Weichmann et al. | | |
| 6,684,790 | B2 | 2/2004 | Bestmann et al. | | |
| 6,972,870 | B2 | 12/2005 | Koguchi | | |
| 7,224,490 | B2 | 5/2007 | Schneider et al. | | |
| 7,724,922 | B2 * | 5/2010 | Furukawa et al. | ............ | 382/112 |
| 2001/0038388 | A1 | 11/2001 | Shiraishi | | |
| 2002/0002923 | A1 | 1/2002 | Eisele et al. | | |
| 2002/0043172 | A1 | 4/2002 | Hauck | | |
| 2003/0020703 | A1 * | 1/2003 | Holub | ........................... | 345/207 |
| 2003/0136288 | A1 | 7/2003 | Bestmann et al. | | |
| 2004/0080765 | A1 * | 4/2004 | Nishide et al. | ................. | 358/1.9 |
| 2004/0080798 | A1 * | 4/2004 | Nishide et al. | ................ | 358/518 |
| 2004/0086156 | A1 * | 5/2004 | Furukawa et al. | ............ | 382/112 |
| 2004/0179717 | A1 * | 9/2004 | Furukawa et al. | ............ | 382/112 |
| 2005/0174590 | A1 * | 8/2005 | Kubo | ............................. | 358/1.9 |
| 2005/0213117 | A1 * | 9/2005 | Clark et al. | .................... | 358/1.1 |
| 2006/0170996 | A1 * | 8/2006 | Headley et al. | ............... | 358/518 |
| 2006/0197757 | A1 * | 9/2006 | Holub | ........................... | 345/207 |
| 2006/0280360 | A1 * | 12/2006 | Holub | ........................... | 382/162 |
| 2007/0019216 | A1 * | 1/2007 | Chodagiri et al. | ............. | 358/1.9 |
| 2007/0079717 | A1 | 4/2007 | De Vries et al. | | |
| 2007/0144375 | A1 * | 6/2007 | Jeschonneck et al. | ........ | 101/248 |
| 2009/0188405 | A1 * | 7/2009 | Stiel | .............................. | 101/484 |
| 2010/0157371 | A1 * | 6/2010 | Miyata | ......................... | 358/1.15 |
| 2010/0289835 | A1 * | 11/2010 | Holub | ........................... | 345/690 |

FOREIGN PATENT DOCUMENTS

| | | | |
|---|---|---|---|
| DE | 19506425 | A1 | 8/1996 |
| DE | 19844495 | A1 | 4/2000 |
| DE | 10201918 | A1 | 7/2003 |
| DE | 10213708 | A1 | 10/2003 |
| DE | 102004021601 | A1 | 12/2005 |
| DE | 60116680 | T2 | 7/2006 |
| EP | 0870609 | A2 | 10/1998 |
| EP | 1149703 | A2 | 10/2001 |
| EP | 1155855 | A2 | 11/2001 |
| EP | 1160081 | A2 | 12/2001 |
| EP | 1365576 | A2 | 11/2003 |
| EP | 1184176 | A3 | 1/2004 |
| JP | 2001205782 | A | 7/2001 |
| WO | WO 2005092613 | A2 * | 10/2005 |

OTHER PUBLICATIONS

European Search Report dated Feb. 15, 2008.

* cited by examiner

METHOD AND SYSTEM FOR PRODUCING PRINTING FORMS FOR ANILOX PRINTING PRESSES

CROSS-REFERENCE TO RELATED APPLICATION

This application claims the priority, under 35 U.S.C. §119, of German application DE 10 2006 050 539.4, filed Oct. 26, 2006; the prior application is herewith incorporated by reference in its entirety.

BACKGROUND OF THE INVENTION

Field of the Invention

The present invention relates to a method and a system for producing at least one printing form for a printing process on a printing press, in which a first printing form is produced on the basis of first image data, and a printing image is printed on a printing substrate with the printing form.

The proposed method and the proposed system are intended to solve problems, in particular, which occur in the use of printing presses without inking zones, such as anilox printing presses.

A corresponding printing press is described in European Patent Application EP 0 870 609 A2. Reference is made in that case to the full scope of the device which is described therein for a printing press of that type having an anilox roll, that is to say an engraved roll, an applicator roll, a printing form cylinder and an inking system.

In conventional offset printing presses which have inking zones, the supply of the printing ink is set in zones through the use of an inking zone controller. As a result, the ink density and, in particular, the tonal value of the printing image as well, can be regulated within the printing press in the corresponding zones during printing. The control of zone screws which regulates the ink quantity is generally regulated in that case according to the current prior art, as a function of printing originals for different printing inks. Printing inks which are generally used in four color printing are the printing inks cyan, magenta, yellow and black (CMYK). The printing originals which are separated according to printing colors are also called color separations. The printing originals are scanned as a rule and are exposed onto the printing plates by way of an exposer. Previously, the exposure of film was also provided as an intermediate step.

Today, the page description languages Post Script (PS) and PDF (portable document format) are largely used as data formats for describing the printing originals. In order to generate the image data, the separated printing originals are scanned in a raster image processor (RIP) and are converted into a corresponding matrix or bitmap. In this case, the individual pixels which correspond to the exposer resolution are each assigned a value as a function of the gray value which is to be achieved. This assignment generally takes place on the basis of a range of threshold values. For example, a raster cell can be assigned a number of pixels. Depending on the gray value of the corresponding printing original, a number of pixels which is associated with this gray value is exposed and in this way a raster dot which corresponds to the gray value is set as an image. For this purpose, the image data assume values 0 or 1, depending on whether or not the pixels have an image set.

A plurality of exposed pixels or raster dots on a printing plate represents a corresponding image point and, as a function of the number of exposed points, a gray value is represented which corresponds to the gray value of the original image point of the printing original.

A change in the actual tonal value which is printed onto the printing substrate by the printing press occurs as a function of the tonal value which is to be displayed, the printing plate exposer which is used and the printing press which is used. The inking zone screws are automatically set as a function of the expected tonal value increase and the corresponding parameters of the printing press and the printing plate exposer, in such a way that a tonal value which is as close as possible to the desired tonal value is produced on the resulting printing image on the printing substrate. Furthermore, the printer has the freedom to regulate the ink quantity through the inking zone controller in the individual inking zones in such a way that he or she can also regulate the ink density and the tonal values in boundaries within the inking zones after the exposure of the printing plates, according to his or her perception. A corresponding method for controlling the area coverage of a printing plate and the ink quantities in the printing press is disclosed in German Published, Non-Prosecuted Patent Application DE 102 01 918 A1, corresponding to U.S. Pat. No. 6,684,790, with reference being made in this case to the full scope of the latter.

Regulation of the quantitative supply of ink through the use of inking zone screws is not possible at all in the above-described printing presses without inking zones. The printer is therefore not given any possibilities of regulating the ink quantity in defined regions which can also correspond to inking zones and therefore of manipulating the printed ink density or the tonal value on the printing substrate. Manipulation of the ink densities over a region which is not identical with inking zones or which even extends transversely with respect to the latter is not possible, even in printing presses which have inking zones.

BRIEF SUMMARY OF THE INVENTION

It is accordingly an object of the invention to provide a method and a system for producing printing forms for anilox printing presses, which overcome the hereinafore-mentioned disadvantages of the heretofore-known methods and systems of this general type and with which it is possible for a printer to also manipulate ink density or tonal value in a resulting printing image on printing substrate after exposure of a first printing plate within a printing press, in particular a printing press without inking zones.

With the foregoing and other objects in view there is provided, in accordance with the invention, a method for producing at least one printing form for a printing process on a printing press. The method comprises producing a first printing form based on first image data, printing a printing image on a printing substrate with the printing form, generating correction values in vicinity of the printing press in regions, based on at least the printing image, using the correction values for correcting printing originals on which printing is based and/or screened image data, and producing at least one second printing form based on at least the correction values.

According to the circumstances, the correction values can, for example, be desired changes in the tonal values or ink densities in a defined region of the printing image. The correction values are used for correcting the printing originals which correspond to the colors in dependence on which colors are to have their separations adapted. It is, of course, also possible that it is not the printing originals which still have to be screened that are corrected, but directly the image data which have already been screened. In this case, this is then corrections of the individual raster cells or raster dots of the raster bitmap. Use of the method during repeated screening of the printing originals is also conceivable and should also be included according to the invention.

In accordance with another feature of the invention, in order to achieve operation which is as simple as possible for determining the required correction values, the printed printing image is advantageously displayed on a monitor and it is possible for regions to be marked and/or selected, for which correction values are to be generated.

In accordance with a further feature of the invention, for this purpose, for example, the printed printing image on the printing substrate can be scanned first of all and then displayed on a corresponding monitor. Correction values which correspond to the new tonal values or ink densities which are desired there can then be generated in the selected regions or in the marked regions.

Regions which are marked can, for example, be defined objects, such as houses or people, or positions within the printed printing image. Marking of this type can be input, for example, through a touch screen of the monitor or else can be generated through automatic detection of objects within the printing image.

In accordance with an added feature of the invention, the selectable regions are provided in the manner of zones which extend in the printing direction at least over the entire printing image. In this case, these zones can advantageously correspond to the inking zones which are known to the printer. They can then, for example, be 32.5 mm wide, and a change in the tonal values or ink densities in the individual inking zones can be performed by a printer in the manner which is known to him or her, such as for setting the inking zone screws. Instead of then setting inking zone screws, corresponding correction values are generated in this marked region.

In accordance with an additional feature of the invention, in order to provide the printer with the zones in a particularly simple manner, these selectable regions are provided on the monitor as structures which superimpose the displayed printing image. Apart from zones or inking zones which are provided as selectable regions, there can, of course, also be provision for interfaces within the printing image to be detected automatically and to be provided as correspondingly selectable regions.

In accordance with yet another feature of the invention, in order to further refine the selected correction, that is to say the correction values, the displayed printing image is divided into zones, and the zones are constructed from at least three bands which extend in the longitudinal direction over the entire printing image. As a result, a rough setting can be performed in the displayed zones first of all, and more precise correction values can be set for the individual bands. In this case, the correction values can act, in particular, simply always over the entire zone and additively over the corresponding bands. In this case, these bands can either be displayed or stored only for manipulation of the tonal values or ink densities.

In accordance with yet a further feature of the invention, in order to ensure that jumps do not occur within the tonal values or ink densities between the individual zones, the correction values are advantageously adapted band for band to the adjacent zones, so that an adapted profile of one zone to the adjacent zones results.

In accordance with yet an added feature of the invention, it is particularly advantageously possible for this profile to be set. An operator is therefore provided with a way in which he or she can achieve an optically attractive profile over the entire width of a printed sheet.

In accordance with yet an additional feature of the invention, alternatively the displayed printing image is divided in the longitudinal direction into adjacent segments. In this way, marking or selection of defined objects within the printing image is not limited to longitudinally oriented zones, but instead regions can be selected simply which lie within the printing image and are completely enclosed by an interface. In the case of corresponding marking or selection of a region of this type, all segments which lie within this region are then selected. For segments which lie only partially within this region, there can then be provision for corresponding correction values to be adapted to their proportion which lies in the boundary region.

In accordance with again another feature of the invention, all segments are therefore selected by corresponding marking and the correction values are generated for the selected segments. In this case, there is also advantageously provision for the correction values of the segments of the selected region toward the boundaries of the region to be adapted to the segments which adjoin it from the outside. This adaptation should also advantageously be capable of being set. In this case, in particular, there is also provision, additionally or as an alternative, for it also to be possible to set the width of the boundary region, in which a corresponding adaptation takes place. In this way, a particularly uniform profile from a selected object or region to the regions outside the selected object can be effected.

In accordance with again a further feature of the invention, it is possible for these correction values or correction data to be generated in the region of the printing press by a user. In order to produce adapted or corrected printing forms, there is then provision for these correction data to be transferred according to the invention to a raster image processor (RIP) or to a printing form production device. The printing originals or the screened image data can then be adapted through the transferred correction values in accordance with the stipulations of the user.

In accordance with again an added feature of the invention, in order to ensure that the user can detect which effect the corrections that are performed by him or her have on the printing image, the RIP or the printing form production device advantageously corrects the screened image data or the objects which are the basis of the image data in accordance with the correction values and then optionally transfers the corrected image data to the printing press again after screening, and an image of the corrected printing image is displayed on the basis of the corrected image data. This can take place, for example, in such a way that only the data for the marked region are corrected and transmitted back and then these corrected image data are placed over the displayed printing image. In this case, there can be provision, in particular, for it to be possible for different transparencies of the superimposed printing image to be set. A complete replacement of the displayed printing image at least in regions with the corrected image data can also occur. The user then has the possibility of seeing the results of his or her correction very quickly by the communication of the printing press with the printing form stage, that is to say with the RIP, or directly with the printing plate exposer. In particular, there can also of course be provision according to the invention for a further RIP to be provided in the region of the printing press at least for displaying the corrected data of the printing image. The RIP can be configured as hardware or as software.

In accordance with again an additional feature of the invention, if conventional inking zones are used within a printing press, it is possible for the printer to reduce or increase the provided ink quantity within predefined limits. In order to also make a corresponding feeling possible for increasing or reducing the ink quantity for the proposed printing units without inking zones, printing is carried out by way of overinking and a change in the inking of the printing substrate is always set through a correction of the screening during the printing form production of the at least subsequent second printing form. This overinking can be taken into consideration in this case during the production of the first printing form. An increase in the ink quantity can therefore also be realized through the screening by a correction of the screening during the production of the second printing form.

Overall, changes to the printed printing image which are carried out on the printing press can be correction values which are either absolute values of individual image points or raster dots, or correction values can be generated which represent the relative changes of defined image points or raster dots. These values can then be transmitted back to the preprinting stage by the printing press and can be used there to produce a further printing form.

In accordance with still another feature of the invention, the printing process is an anilox printing process. The proposed method can be used particularly favorably for producing printing forms in this printing process without inking zones.

In accordance with still a further feature of the invention, the printing form is a printing plate and a printing plate exposer which is separate from the printing press is used as the printing form production device. It is then not important, at which location the printing plate exposer is situated. The printing image can then be processed directly on the printing press, the generated correction values are sent back to the preprinting stage, that is to say they are transmitted to the printing plate exposer, and it is not particularly necessary to provide this printing plate exposer in the vicinity of the printing press. High flexibility is therefore achieved.

In accordance with still an added feature of the invention, in order to take into consideration, during the printing form production, properties of the printing press itself which can lead to deviating tonal values or ink densities on the printing substrate, first of all a printing form is produced on which defined test shapes are provided. These test shapes should advantageously have control wedges which are each assigned to one region. This type of region of the printing form can, for example, be an above-described zonal region. Irregularities in the inking and/or an increase in tonal value can be detected locally in regions during the printing of the printing substrate through these control wedges. Correction values can then be produced by using these determined irregularities and the correction values can be transmitted from the printing press to the RIP or the printing form production device, that is to say the printing plate exposer, and can then be taken into consideration at least during the production of the first printing form. This consideration can be effected in such a way that the corresponding local correction of the image data or the raster dots is already used during the production of the first printing form.

With the objects of the invention in view, there is concomitantly provided a printing system, comprising at least one printing press and a printing form production device for producing at least one printing form for a printing process on a printing press. A first printing form is produced on the basis of first image data, and a printing image is printed on the printing substrate by way of the printing form in order to carry out the method as it has been described above.

This printing system is distinguished by the fact that the printing press is a printing press without inking zones, for example an anilox, in particular an anilox printing press. Furthermore, a display screen is provided and the printed printing image is to be displayed on the display screen. Additionally, marking elements which are suitable for marking selected regions of the displayed printing image are provided in the printing system. Furthermore, switching elements should be provided for setting correction values within the regions which are marked in this way. In addition, the printing form production device should be a printing plate exposer, and the printing plate exposer and/or the printing press have a raster image processor (RIP). Return lines are to be provided for transmitting correction values from the printing press to the printing plate exposer and/or the RIP and back to the printing press. Furthermore, at least one confirmation element is to be provided in the region of the printing press for confirming a displayed corrected printing image and/or for starting the production of a printing form on the basis of the corrected printing image.

In this way, it is possible to carry out the method which is described further above by way of the printing system which is proposed herein.

Other features which are considered as characteristic for the invention are set forth in the appended claims.

Although the invention is illustrated and described herein as embodied in a method and a system for producing printing forms for anilox printing presses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
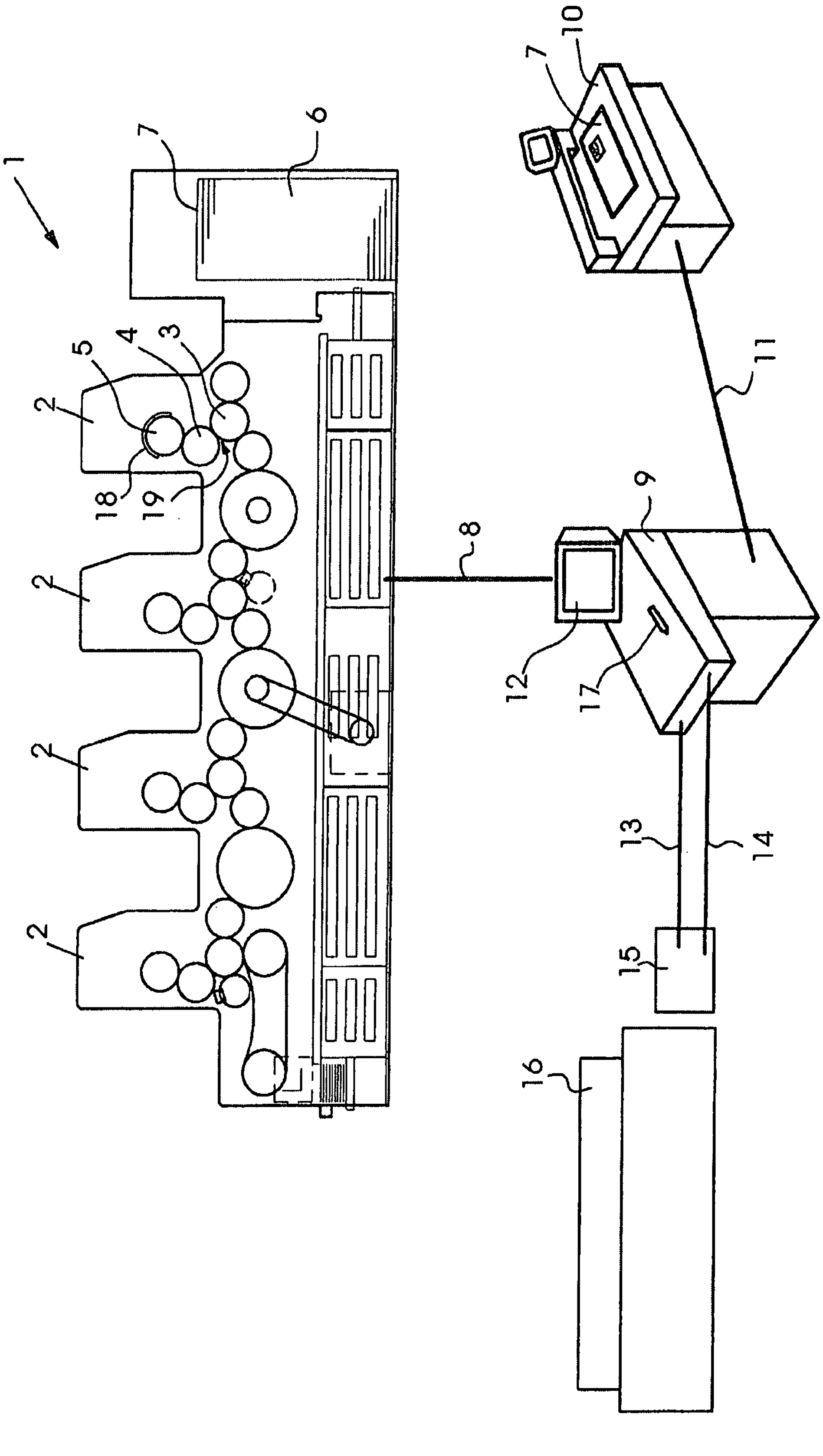
FIG. 1 is a diagrammatic, partly-sectional, partly-perspective and partly-elevational view of a printing system, including a printing press and a printing plate exposer.

Referring now to the figures of the drawings in detail and first, particularly, to FIG. 1 thereof, there is seen a printing system according to the invention having an anilox printing press 1 which, in the case that is shown, has four printing units 2. The printing units 2 do not have any inking zone screws and have only one short inking unit, in which the printing ink is transferred onto a printing plate cylinder 5 through an engraved roll. This is an embodiment of an anilox inking unit which is already known per se. A printing plate 18, which is inked through the engraved roll, transfers a printing image 201 (indicated in FIG. 3) onto a sheet 7 through a blanket cylinder 4. The sheet 7 is guided from a feeder stack 6 through the printing press 1 along a transport path and therefore passes into a press nip 19 which is formed by the blanket cylinder 4 and an impression cylinder 3. The ink is transferred onto the sheet 7 in the press nip 19. As described, the printing unit 2 should be an anilox unit. In this case, embodiments are possible, in which a dampening unit is provided or in which printing is to be carried out without water.

The printing press 1 which is shown herein is therefore a sheet-fed offset printing press.

The printing press can be controlled from an operating desk 9 through a communication line 8. The operating desk 9 has a monitor 12 for supporting the control or for the control itself.

After a sheet 7 has been guided from the feeder stack 6 through the printing units 2 of the printing press 1, the complete printing image 201 has been printed thereon. The printing image 201 can be detected by a corresponding detecting device. In the case which is shown herein, an external sheet scanner 10 is provided, on which a sample print of a sheet 7 can be placed and scanned. As an alternative, it is of course also possible to detect the sheet 7 within the printing press 1 by way of a corresponding scanning device.

The sheet scanner 10 is connected to the operating desk 9 through a transfer line 11. In this way, all of the data of the printed sheet 7 can be transmitted from the sheet scanner 10 to the operating desk 9 and can be displayed there. This can take place, for example, on the monitor 12. Overall, it is also possible for the monitor 12 per se to represent the operating desk 9. It can be sufficiently large to display a complete sheet 7 and can be configured as a touchscreen. In this way, all inputs for controlling the machine can be carried out directly through the surface of the monitor 12.

Figure 3:
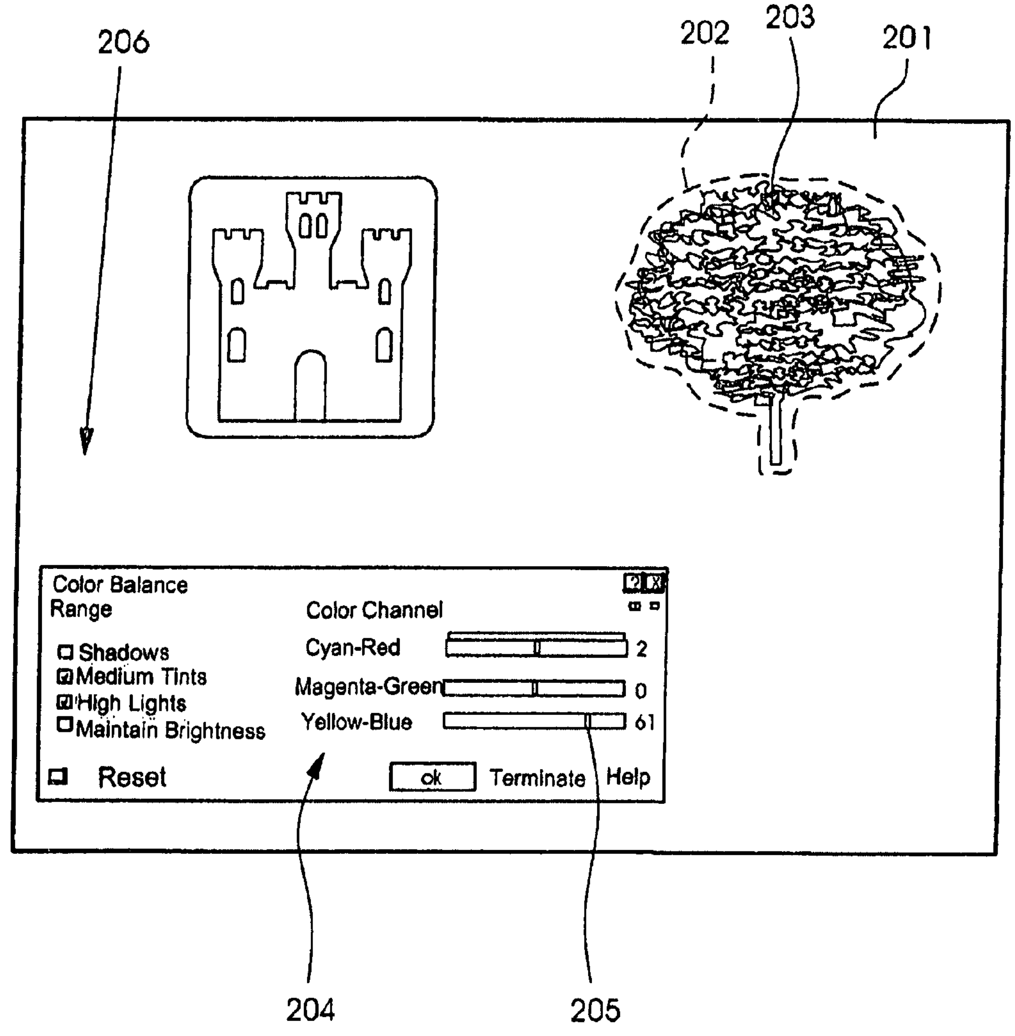
FIG. 3 is a plan view of a marking in regions.
Figure 4:
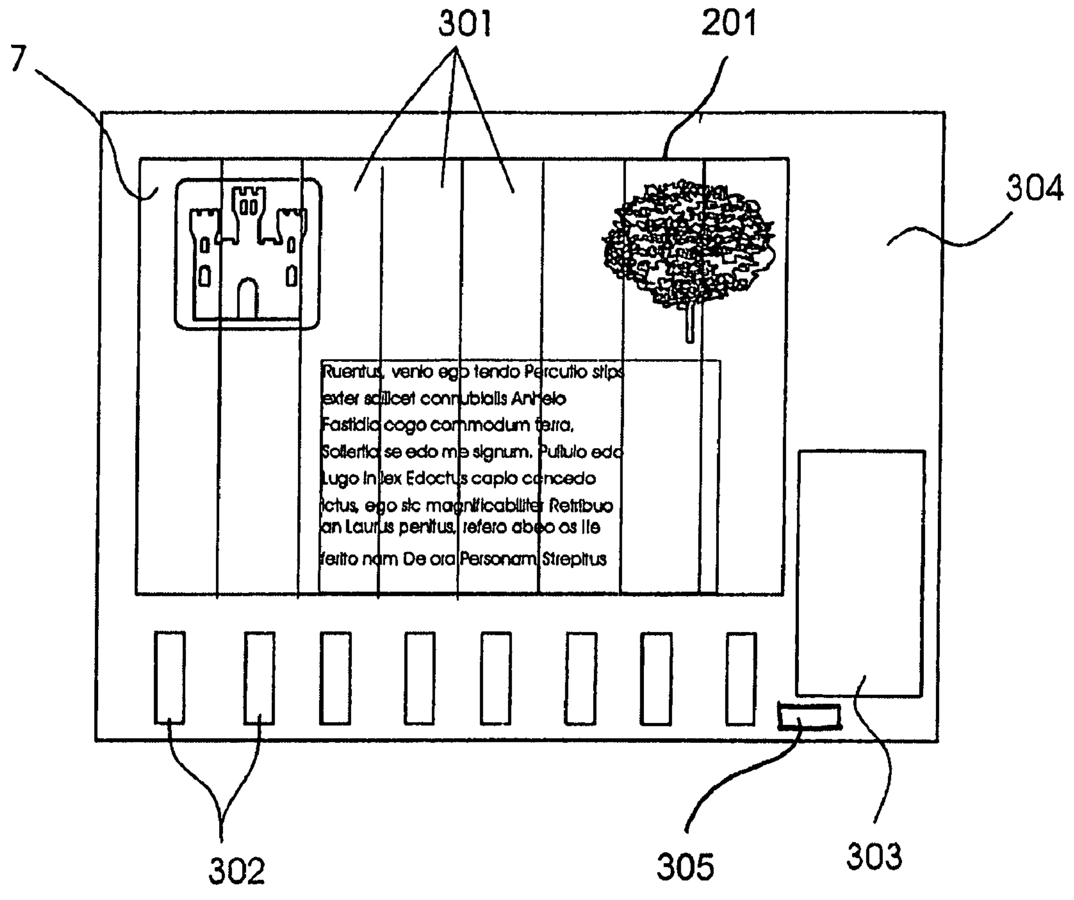
FIG. 4 is a plan view of a monitor and a sheet showing selection by zones.

Firstly the printing press 1 can be operated from the operating desk 9, and secondly corrections can be carried out on the printing image 201, through the use of operating elements. Various operating elements 204, 205, 206, 302, 303 can be provided for this purpose, as is shown in FIGS. 3 and 4. The operating elements either can be provided as hardware on the operating desk 9 or can be displayed on the monitor 12. Furthermore, a marking element 17 is provided in this case, by way of which defined regions on the printed sheet 7 that is displayed on the monitor 12 can be marked. Corrections can then be carried out in the marked regions through the operating elements 204, 205, 206, 302, 303, and correction values can be set manually in this way. The correction values can then be transmitted to a raster image processor 15 (RIP) over a communication line 13. In the case which is shown herein, the RIP 15 is associated with a printing plate exposer 16. Furthermore, it is possible for the RIP to be integrated directly into the printing plate exposer 16 and/or provided as software on a computer. The RIP 15 makes image data available, by way of which the printing plate exposer 16 sets images on the printing plates 18 depending on the color separation. The printing originals which are assigned to the individual color separations can be adapted to the corrected values for the printing image 201 through the correction values which are transmitted to the RIP over the communication line 13. The RIP 15 can produce new image data on the basis of the adapted printing originals. The image data can be transmitted back to the operating desk 9 over a communication line 14 and converted to the extent that corresponding changes in the resulting printing image 201 are shown on the monitor 12. In this way, corrections which are carried out by the operating elements 204, 205, 206, 302, 303 and 17, that is to say changes to the printing image 201, can be displayed directly on the monitor 12. If the changes which are produced in this way are satisfactory, that is to say if the displayed printing image 201 corresponds to the printing image which is desired by an operator, an OK can be given by a corresponding operating field and the RIP 15 can transmit the corresponding screened image data to the printing plate exposer 16 which produces new printing plates 18 for the individual printing units 2 on the basis of the image data which have been corrected in this way.

Figure 2:
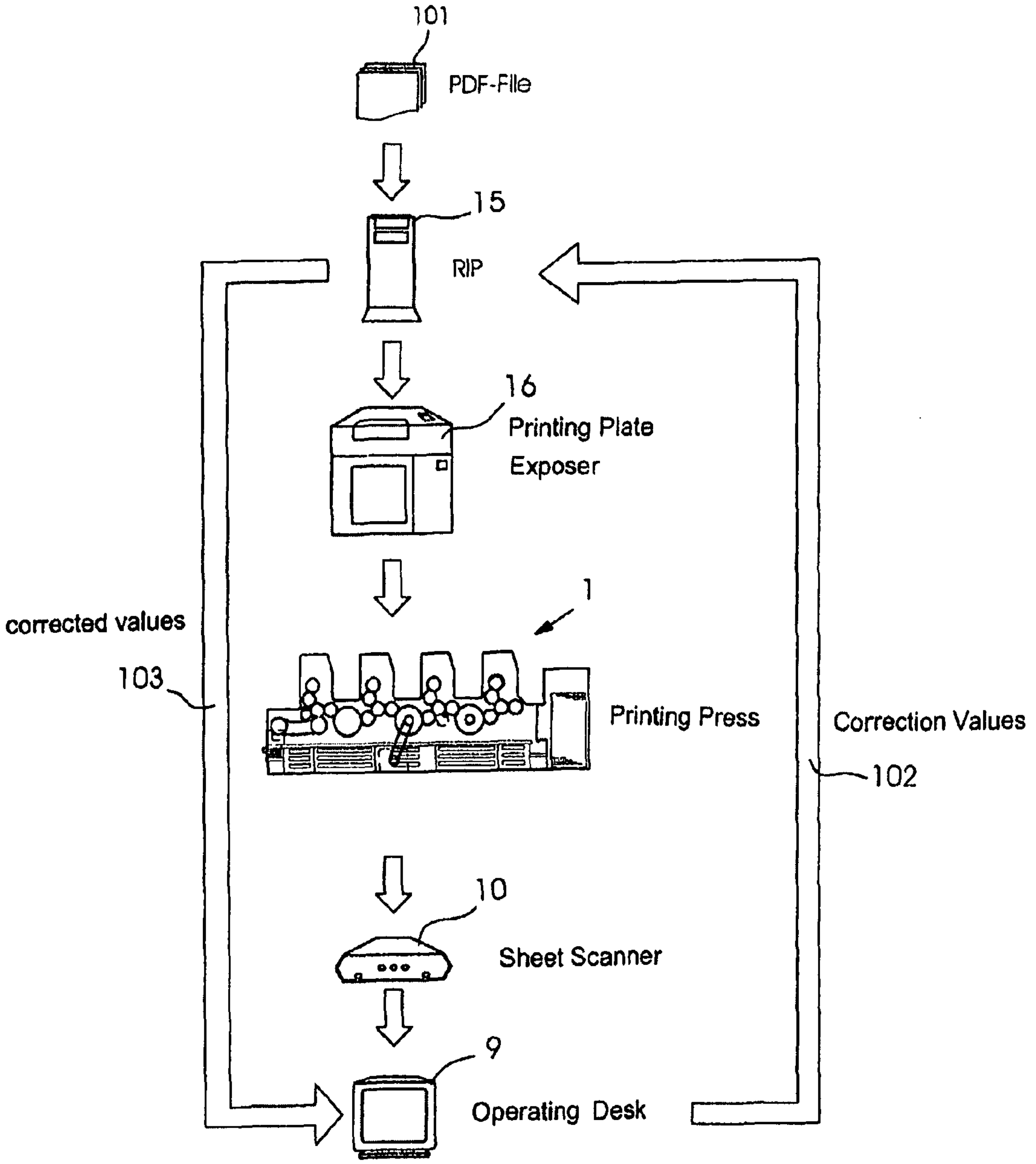
FIG. 2 is a sequence plan for producing a corrected printing plate.

FIG. 2 shows a corresponding sequence plan for the production of printing plates for an anilox printing press 1.

Individual pages are composed from images and text within a non-illustrated upstream workflow. The individual pages are output by way of corresponding software to form printed sheets. The output sheets are stored as PDF files 101. The PDF files 101 or postscript files (PS) are transmitted to the RIP 15. Within the RIP 15, the transmitted PDF files 101 are split into the corresponding printing originals of a color in accordance with the process colors which are used in the printing press 1, that is to say into the corresponding color separations. The color separations are then screened individually within the RIP 15, in order to generate the screened image data for the printing plate exposer 16 in this way. The screened image data represent a bitmap of the printing plate 18 which is to be exposed, with each possible exposer point being represented through a raster dot. A 0 or 1 is stored within the bitmap depending on whether or not the raster dot is to be exposed.

The image data which are generated in this way are transmitted to the printing plate exposer 16. A printing plate 18 which corresponds to the corresponding process color has images set on it within the printing plate exposer 16 for each printing unit 2 of the printing press 1. Possible further process steps for producing the printing plate 18 are not shown in this case for the sake of clarity.

The printing plates 18 which have been produced in this way are introduced into the individual printing units 2 of the anilox printing press 1. First sheets 7 are printed during first printing of the anilox printing press 1 with the first printing plates 18. The sheets 7 are subsequently scanned and evaluated in a sheet scanner 10. The sheet scanner 10 can be provided externally from the printing press 1 or else it can be integrated into it.

The printing image 201 which is scanned image point by image point in this way is displayed on the monitor 12 of an operating desk 9. As has already been described, defined regions or objects 203 can be marked or selected in this case and then corrected, that is to say changed, by the user in accordance with the stipulations. In this way, correction values 102 are generated which are transmitted back to the RIP 15 from the operating desk 9. The RIP 15 then generates new image data on the basis of the corrected printing originals. New values for the image points of the printing image 201 which is displayed on the operating desk 9 can be determined on the basis of the image data. The corrected image points or the corrected image data can be transmitted to the operating desk 9 by the RIP 15 as corrected values 103. Either within the RIP 15 or within the operating desk 9, the image points which are to be displayed of the corrected printing image 201 are then calculated on the basis of the corrected image data and finally displayed on the monitor 12 of the operating desk 9. If the newly displayed corrected image points of the printing image 201 meet the requirements of an operator, he or she can initiate the production of a new corrected printing plate 18 by the printing plate exposer 16 through a corresponding field on the operating desk 9. Should the corrected printing image 201 which is then displayed not meet his or her expectations, he or she has the possibility of improving the adaptation of the printing image to his or her requirements through further correction steps. In this case, correction values 102 are transmitted repeatedly to the RIP 15 which transmits new corrected values 103 to the operating desk 9 on the basis thereof. It is only when an operator has confirmed the corrected printing image 201 that the RIP 15 is caused to transmit the corrected image data to the printing plate exposer 16 which then begins to set images on new printing plates 18. In this case, it is possible, in particular, that should only correction values for individual color separations be present, only these corrected color separations are used for producing new printing plates 18. The new printing plates 18 are again introduced into the printing press 1, where they replace the original first printing plates 18. Sheets 7 are once again printed which are then scanned online or offline by a sheet scanner 10. The new printing images 201 which are generated in this way are again displayed on a monitor 12 of the operating desk 9 and, for the case where the printing image 201 which has been corrected in this way still does not meet the requirements of the user, it is possible according to the described method to produce a new printing plate 18. Otherwise, a complete print job can be carried out in the printing press 1 by way of satisfactorily produced printing plates 18.

FIG. 3 shows one example for the possible correction of the printing image 201 in regions.

Part of the printed sheet 7 is shown in this case. The scanned printing image 201 is displayed on a monitor 12 of the operating desk 9. In addition to the displayed printing image 201, corresponding switching elements and slide regulators 204, 205 are situated in this case within a correction selection range 206. A selection can be made, for example, on the operating desk 9 as to which type of switching element and slide regulators are situated within the correction selection range 206. In the case which is shown herein, the correction selection range 206 is a range for correcting the color balance. Accordingly, switching elements for brightness, high lights, medium tints and shadows are shown in this case. A corresponding selection through the switching elements 204 can be set more accurately through the slide regulators 205. The setting through the slide regulators 205 or switching elements 204 is applied to a marked region within the displayed printing image 201. This region can be selected directly on the monitor 12 through a marking element 17. For this purpose, a marking 202 can be positioned on the displayed printing image 201 and an object 203 can be marked. In this case, in particular, further auxiliary devices are conceivable which make the selection of a defined object 203 easier, for example through the detection of interfaces. The marking element 17 can, for example, be a stylus or a pen, with which the monitor 12 can be acted on directly, or it can also be a non-illustrated trackball or a mouse, with which the monitor 12 can be acted on.

The changes which are made in the marked region in this way are again displayed on the monitor 12, as described. This can be effected by a replacement of the originally displayed region or by a superimposition of the corrected region. For example, it is possible for certain colors, such as yellow, blue, green or magenta, to be reduced or increased. It is also possible for the brightness to be changed in the defined marked region. In particular, the entire printing image can also be considered as a marked region, if it is selected. Changes over the entire printing region are therefore also possible.

FIG. 4 shows one example of defined selectable regions which can be selected in the region of the displayed printing image 201. The selectable regions are positioned over the printing image 201. In the case which is shown herein, they are inking zones 301 which have been placed over the entire scanned and displayed printing image 201.

These inking zones 301 are zones which symbolically represent the inking zones of an offset printing press having inking zone adjusting elements. As a result, an operator can have the same feeling with the printing press without inking zones as if the inking zones which are known to him or her were actually present.

The individual inking zones 301 can be adapted to the requirements of an operator through inking zone regulators 302 which are either provided as mechanical regulators on the operating desk 9 or are made available virtually on the monitor 12. Corresponding correction values for all image points which lie within the corresponding inking zone 301 are then generated and transmitted to the RIP 15, depending on the setting and use of the inking zone regulators 302. In the case which is shown herein, in addition to the displayed printing image 201 of the sheet 7, a monitor display 304 also includes the inking zone regulators 302 and a further setting and changeover range 303. In this case, further possible setting functions for the individual inking zones or inking zone regulators 301, 302 can also be provided. For confirming a corrected printing image 201 or for starting production of a printing form based on the corrected printing image 201 a conformation element 305 is provided.

Figure 5:
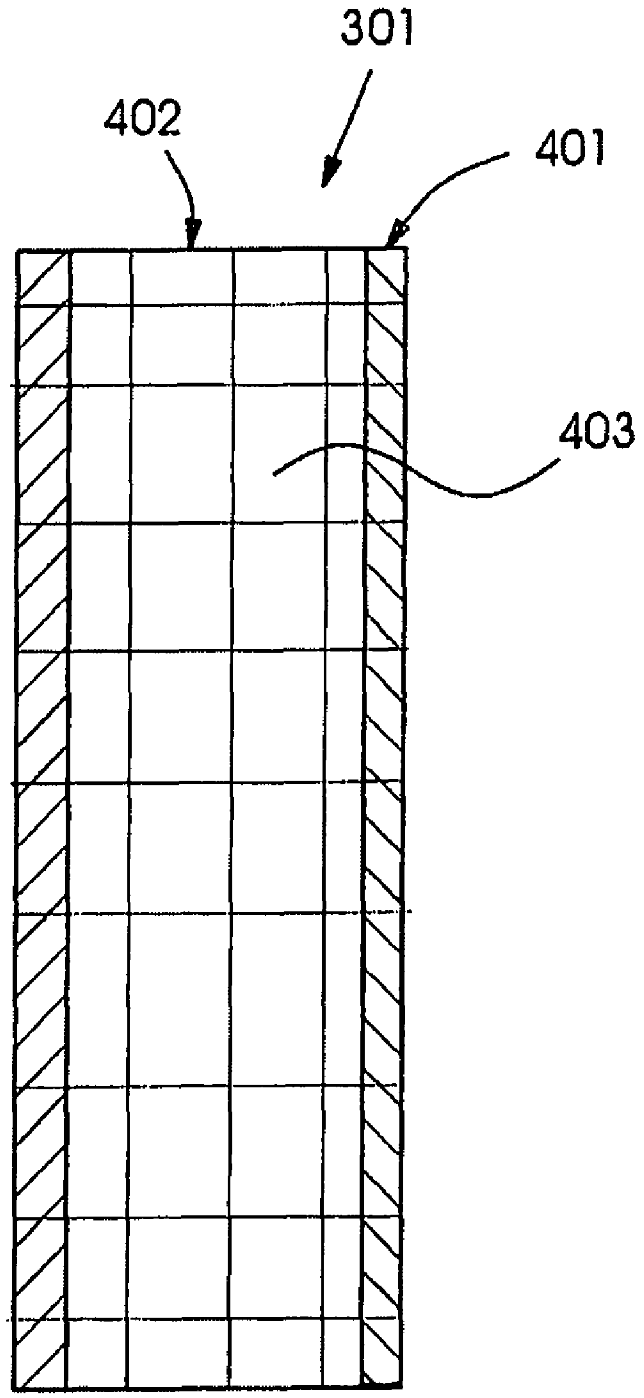
FIG. 5 is a plan view showing a representation of a zone.

FIG. 5 shows an illustration of an inking zone 301, as is stored for generating correction values 102. The inking zone 301 is divided into individual bands 401 and 402. The bands cover the entire sheet 7 in the longitudinal direction and occupy only a fraction of an inking zone 301 transversely with respect to the former. In this case, the inking zone 301 can be constructed of bands 401, 402 having different widths. The bands 401 in the edge regions of an inking zone 301 are preferably narrower than the bands 402 in the center region of an inking zone 301. The correction values 102 are then not generated identically for the entire inking zone 301 by the final position through the inking zone regulator 302, but instead modified correction values 102 are generated for the individual bands 401, 402. In this case, the correction values 102 for the bands 401 in the outer region of an inking zone 301 are adapted to the inking values of the adjacent inking zones 301. In this case, this can, in particular, be an adaptation to inking values which have already been corrected for the adjacent inking zones 301. The width of this adaptation region through the bands 401 can be set, in particular, through further non-illustrated selection regulators. A plurality of bands 401 can then be selected for the transition of the corrections of one inking zone 301 to an adjacent inking zone 301.

In order to select a region, as has been shown in FIG. 3, the inking zones 301 can be split into different segments 403. The segments can then be selected by the marking 202, as has been shown in FIG. 3, depending on the setting, independently of the inking zones 301. It is also possible in this case, although a uniform correction is carried out for all segments 403 of the marked object 203 through a corresponding slide regulator 205, for the correction values 102 which are generated in this way to be modified themselves in the region of the marking 202. This then results in different correction values 102 for the segments 403 which lie in the region of the marking 202 than for the segments 403 which lie within the object 203. Furthermore, it is possible to define the number of segments 403 or their spacing from the marking 202 as adjustable parameters, with the result that a transition region from the correction of the marked object 203 to the remaining surrounding printing image 201 can be set. In particular, it is possible to set the adaptation itself, that is to say its extent or gradient, through non-illustrated regulators.

In this way, as a result of a communication of changes which are performed on the operating desk 9 with the RIP 15 of the preprinting stage, it is also possible to set changes on the resulting printing image 201 for an anilox printing press 1. Those changes would otherwise only be possible through inking zones of a conventional offset printing press. In particular, even changes which are not possible even with a conventional offset printing press, can be carried out. In this case, the method could also be used for a conventional offset printing press. A printing plate 18 which has been newly produced in this way then meets the requirements of the user who has carried out the corresponding corrections directly on the printing press 1 on the basis of the sheets 7 which have already been printed and produced.

The invention claimed is:

1. A method for producing at least one printing form for a printing process on a printing press, the method comprising the following steps:

producing a first printing form based on first image data;

printing a printing image on a printing substrate with the printing form;

generating correction values in vicinity of the printing press in regions, based on at least the printing image;

using the correction values for correcting at least one of printing originals on which printing is based or screened image data;

producing at least one second printing form based on at least the correction values;

displaying the printed printing image on a monitor, and generating at least one of markable or selectable regions for which correction values are generated;

providing the selectable regions in the manner of zones extending in printing direction at least over an entire printing image;

dividing the displayed printing image into zones, and constructing the zones from at least three bands extending in longitudinal direction over an entire printing image; and adapting the correction values band for band to adjacent zones, resulting in an adapted profile of one zone to adjacent zones.

2. The method according to claim 1, wherein the correction values correspond to at least one of desired tonal values or ink densities.

3. The method according to claim 1, which further comprises providing the selectable regions on the monitor as structures which superimpose the displayed printing image.

4. The method according to claim 1, which further comprises setting the profile.

5. The method according to claim 1, which further comprises dividing the displayed printing image in longitudinal direction into adjacent segments.

6. The method according to claim 5, which further comprises selecting marking of all of the segments of one region, and generating correction values for the selected segments.

7. The method according to claim 6, which further comprises adapting the correction values of the segments of the selected region toward boundaries of the region to segments adjoining it from the outside.

8. The method according to claim 7, which further comprises setting at least one of the adaptation or the boundary region in which an adaptation takes place.

9. The method according to claim 1, which further comprises transferring the correction values to a raster image processor or to a printing form production device.

10. The method according to claim 9, which further comprises correcting the screened image data or objects on which the image data are based in accordance with the correction values and transferring corrected image data to the printing press, with the RIP or the printing form production device, and displaying an image of the corrected printing image based on the corrected image data.

11. The method according to claim 9, which further comprises using a printing plate as the printing form and using a printing plate exposer separate from the printing press as the printing form production device.

12. The method according to claim 9, which further comprises:

initially producing all test shapes on the printing form; providing the test shapes with control wedges each assigned to one respective region;

determining at least one of irregularities in regional inking or an increase in tonal value;

generating correction values using determined irregularities;

transferring the correction values to the RIP or the printing form production device; and taking the correction values into consideration for correction of the image data or raster dots at least during the production of the first printing form.

13. The method according to claim 1, which further comprises carrying out printing by overinking and setting a change in the inking of the printing substrate through a correction of screening during printing form production of the at least second printing form.

14. The method according to claim 1, wherein the correction values are absolute values of individual image points or individual raster dots.

15. The method according to claim 1, wherein the correction values are relative values of individual image points or individual raster dots representing information about a required correction of the points or dots.

16. The method according to claim 1, wherein the printing process is without inking zones.

17. A printing system, comprising:

at least one printing press without inking zones, said at least one printing press printing a printing image in a printing process on printing substrate with a printing form, for carrying out the method according to claim 1, said at least one printing press including a display screen for displaying a printed printing image, marking elements for marking selected regions of a displayed printing image, and switching elements for setting correction values in marked regions;

a printing form production device being a printing plate exposer for producing at least one printing form for the printing process on said at least one printing press, said printing form production device producing a first printing form based on first image data;

at least one of said printing plate exposer or said at least one printing press having a raster image processor;

return lines for transmitting correction values from said at least one printing press to at least one of said printing plate exposer or said RIP; and at least one confirmation element in vicinity of said at least one printing press for at least one of confirming a displayed corrected printing image or starting production of a printing form based on the corrected printing image.

* * * * *